United States Patent
Hwang et al.

(10) Patent No.: US 8,509,536 B2
(45) Date of Patent: Aug. 13, 2013

(54) CHARACTER RECOGNITION DEVICE AND METHOD AND COMPUTER-READABLE MEDIUM CONTROLLING THE SAME

(75) Inventors: Hyo Seok Hwang, Seoul (KR); Woo Sup Han, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 259 days.

(21) Appl. No.: 12/945,124

(22) Filed: Nov. 12, 2010

(65) Prior Publication Data
US 2011/0123114 A1    May 26, 2011

(30) Foreign Application Priority Data
Nov. 24, 2009   (KR) ................. 10-2009-0113981

(51) Int. Cl.
*G06K 9/18* (2006.01)
*G06K 9/34* (2006.01)

(52) U.S. Cl.
USPC .......................................... 382/182; 382/176

(58) Field of Classification Search
USPC ............... 382/176–177, 181–182, 190, 199, 382/240, 266, 274–275, 305, 312, 321; 375/240.03, 240.19, 240.27
See application file for complete search history.

(56) References Cited

U.S. PATENT DOCUMENTS

| | | | | |
|---|---|---|---|---|
| 5,583,949 A | * | 12/1996 | Smith et al. | 382/199 |
| 6,366,699 B1 | * | 4/2002 | Kuwano et al. | 382/199 |
| 6,553,131 B1 | * | 4/2003 | Neubauer et al. | 382/105 |
| 7,613,328 B2 | * | 11/2009 | Boregowda et al. | 382/105 |
| 7,729,536 B2 | * | 6/2010 | Eguchi et al. | 382/173 |
| 7,792,362 B2 | * | 9/2010 | Berkner et al. | 382/176 |
| 7,949,187 B2 | * | 5/2011 | Nakamura | 382/177 |
| 8,064,516 B2 | * | 11/2011 | Kojokaro et al. | 375/240.03 |

* cited by examiner

*Primary Examiner* — Kanjibhai Patel
(74) *Attorney, Agent, or Firm* — Staas & Halsey LLP

(57) ABSTRACT

A character recognition device to recognize characters after preprocessing an input image corrects distortion. The character recognition device includes an image input unit to receive an image acquired by an image device, a character position estimator to calculate a probability value of a position of characters of the image to estimate the position of the characters, an image preprocessor to detect a plurality of edges including the characters from the image and to correct distortion of the edges, and a character recognizer to recognize the characters included in a rectangle formed by the plurality of edges.

39 Claims, 19 Drawing Sheets

CHARACTER RECOGNITION DEVICE AND METHOD AND COMPUTER-READABLE MEDIUM CONTROLLING THE SAME

CROSS-REFERENCE TO RELATED APPLICATIONS

This application claims the benefit of Korean Patent Application No. 10-2009-0113981, filed on Nov. 24, 2009 in the Korean Intellectual Property Office, the disclosure of which is incorporated herein by reference.

BACKGROUND

1. Field

Example embodiments relate to a character recognition device to extract and recognize characters included in an image, and a method and computer-readable medium controlling the same.

2. Description of the Related Art

Robots which were only used for industry in the past have become necessary for general environments such as public institutions and homes. Such robots recognize environments using various sensors. Characters which are one form of environment information recognized by a robot are composed of a combination of simple symbols. Since the characters have complexity but contain an enormous amount of information, the recognition of the characters by the robot enables the robot to intelligently act through combination with a speech recognition result.

Meanwhile, character recognition refers to an operation to read a document image through an image input device such as a scanner or a camera, to extract and recognize characters from a character region using a computer, and to obtain text information. Characters are composed of a set of symbols. Since symbols have mutually similar shapes, even when a symbol is slightly modified, the symbol may be recognized as another symbol. Optical Character Recognition (OCR) which is currently used is mostly based on a printed material and has a high character recognition rate.

However, the character recognition technique of the related art has a high character recognition rate when a printed material is properly aligned with respect to a camera. However, if the printed material is inclined, i.e., if the printed material is distorted, the character recognition rate is decreased.

SUMMARY

Therefore, it is an aspect of the example embodiments to provide a character recognition device to correct a distorted image to recognize a character region, and a method and computer-readable medium controlling the same.

The foregoing and/or other aspects are achieved by providing a character recognition device including an image input unit to receive an image acquired by an image device, a character position estimator to calculate a probability value of a position of characters of the image to estimate the position of the characters, an image preprocessor to detect a plurality of edges including the characters from the image and to correct distortion of the edges, and a character recognizer to recognize the characters included in the plurality of edges.

The character position estimator may perform wavelet transform to the input image and grade the wavelet-transformed image.

The grading of the wavelet-transformed image by the character position estimator may be performed by dividing the wavelet-transformed image into a character region, a character boundary region and a background region and grading the regions.

The character position estimator may obtain a co-occurrence matrix from the graded image, substitute the co-occurrence matrix into the following Equation, and calculate the probability of the position of the characters of the image:

$$P(i,j) = \alpha C_{LH}(i,j)[2][2] + \beta C_{HL}(i,j)[2][2] + \gamma C_{HH1}(i,j)[2][2] + \delta C_{HH2}(i,j)[2][2] \quad \text{Equation}$$

(where, $\alpha$, $\beta$, $\gamma$ and $\delta$ denote weights, $C_{LH}(i,j)[2][2]$ denotes a number of "1" accumulated in a second row and a second column of $C_{LH}$, $C_{HL}(i,j)[2][2]$ denotes a number of "1" accumulated in a second row and a second column of $C_{HH1}$, $C_{HL}(i,j)[2][2]$ denotes the number of "1" accumulated in the second row and the second column of $C_{HH1}$, and $C_{HH2}(i,j)[2][2]$ denotes a number of "1" accumulated in a second row and a second column of $C_{HH2}$.)

The image preprocessor may extract edges longer than a predetermined criterion from the input image and extract the plurality of edges including the characters from the extracted edges.

The image preprocessor may extract the plurality of edges including the characters from the extracted edges using a Random Sample Consensus (RANSAC) scheme.

The image preprocessor may randomly extract four edges of the edges longer than the predetermined criterion using the RANSAC scheme, determine whether a rectangle formed by the four edges includes the characters, and extract the four edges including the characters.

The determination of whether the rectangle formed by the four edges includes the characters by the image preprocessor may be performed by determining whether all intersection points between the four edges are present in the image.

The determination by the image preprocessor of whether the rectangle formed by the four edges includes the characters may be performed by determining whether the four edges form a convex rectangle.

The determination by the image preprocessor of whether the rectangle formed by the four edges includes the characters may be performed by checking the number of times of crossing of straight lines formed by intersection points of the four edges to determine whether the four edges form the convex rectangle.

The determination by the image preprocessor of whether the rectangle formed by the four edges includes the characters may be performed by determining whether an angle between one edge and each of another two edges of the four edges are in a first angle range.

The first angle range may be $70° < \theta < 110°$, and, if the angle between one edge and each of the another two edges out of the four edges is in the first angle range, one edge of the four edges may extend to be close to a direction perpendicular to the other two edges.

The determination by the image preprocessor of whether the rectangle formed by the four edges includes the characters may be performed by determining whether an angle between one edge and another edge of the four edges is in a second angle range.

The second angle range may be $\theta < 20°$ or $\theta > 160°$, and, if the angle between one edge and another edge out of the four edges is in the second angle range, one edge of the four edges may extend to be close to a direction parallel to another edge.

The determination by the image preprocessor of whether the rectangle formed by the four edges includes the characters may be performed by determining whether a center of gravity of the probability value of the position of the characters in the image is present in the rectangle formed by the four edges.

The image preprocessor may compare the probability value of the position of the characters in each pixel of the image with a threshold, calculate an x-coordinate average value and a y-coordinate average value of coordinates having the probability value of the position of the characters greater than the threshold, and calculate the center of gravity of the probability value.

The image preprocessor may calculate a homography matrix to correct distortion of the rectangle formed by the four edges, when the four edges including the characters are extracted.

The homography matrix may include a matrix having a relationship between the rectangle formed by the four edges and a rectangle to be restored, and the image preprocessor may apply the homography matrix to all pixels of the image to restore the distorted rectangle.

The character recognition device may further include a binarization unit to perform binarization with respect to the image, the distortion of the edges of which is corrected by the image preprocessor.

The character recognition device may further include a character extractor to extract words and individual characters from the binarized image.

The character recognition device may further include a feature extractor to extract features of the extracted words and individual characters.

The foregoing and/or other aspects are achieved by providing a method of controlling a character recognition device, the method including, calculating, by a computer, a probability value of a position of characters in an input image to estimate the position of the characters, extracting, by the computer, a plurality of edges including the characters to correct distortion, and recognizing, by the computer, the characters included in the plurality of edges.

The calculating of the probability value of the position of the characters in the input image may include performing wavelet transform to the input image, grading the wavelet-formed image, and obtaining a co-occurrence matrix of the graded image to calculate the probability value of the position of the characters.

The obtaining of the co-occurrence matrix to calculate the probability value of the position of the characters may include substituting the co-occurrence matrix into the following equation to calculate the probability value of the position of the characters:

$$P(i,j) = \alpha C_{LH}(i,j)[2][2] + \beta C_{HL}(i,j)[2][2] + \gamma C_{HH1}(i,j)[2][2] + \delta C_{HH2}(i,j)[2][2]$$

Equation (where, $\alpha$, $\beta$, $\gamma$ and $\delta$ denote weights, CLH(i,j)[2][2] denotes a number of "1" accumulated in a second row and a second column of CLH, CHL(i,j)[2][2] denotes a number of "1" accumulated in a second row and a second column of CHH1, CHL(i,j)[2][2] denotes the number of "1" accumulated in the second row and the second column of CHH1, and CHH2(i,j)[2][2] denotes a number of "1" accumulated in a second row and a second column of CHH2).

The extracting of the plurality of edges including the characters to correct the distortion may include extracting edges longer than a predetermined criterion from the input image and extracting the plurality of edges including the characters from the extracted edges to correct the distortion.

The extracting of the plurality of edges including the characters may include extracting four edges of the edges longer than the predetermined criterion using a Random Sample Consensus (RANSAC) scheme, determining whether a rectangle formed by the four edges includes the characters, and extracting the four edges including the characters.

The determining of whether the rectangle formed by the four edges includes the characters may include determining whether all intersection points between the four edges are present in the image.

The determining of whether the rectangle formed by the four edges may include the characters includes determining whether the four edges form a convex rectangle.

The determining of whether the rectangle formed by the four edges may include the characters includes checking a number of times of crossing of straight lines formed by intersection points of the four edges to determine whether the four edges form the convex rectangle.

The determining of whether the rectangle formed by the four edges includes the characters may include determining whether an angle between one edge and each of another two edges of the four edges are in a first angle range.

The first angle range may be $70° < \theta < 110°$, and, if the angle between one edge and each of the other two edges out of the four edges is in the first angle range, one edge of the four edges may extend to be close to a direction perpendicular to the other two edges.

The determining of whether the rectangle formed by the four edges includes the characters may include determining whether an angle between one edge and another edge of the four edges is in a second angle range.

The second angle range may be $\theta < 20°$ or $\theta > 160°$, and, if the angle between one edge and another edge of the four edges is in the second angle range, one edge of the four edges may extend to be close to a direction parallel to another edge.

The determining of whether the rectangle formed by the four edges includes the characters may include determining whether a center of gravity of the probability value of the position of the characters in the image is present in the figure formed by the four edges.

The probability value of the position of the characters in each pixel of the image may be compared with a threshold, an x-coordinate average value and a y-coordinate average value of coordinates having the probability value of the position of the characters greater than the threshold may be calculated, and the center of gravity of the probability value may be calculated.

When the four edges including the characters are extracted, a homography matrix may be calculated to correct the distortion of the rectangle formed by the four edges.

The homography matrix may include a matrix having a relationship between the rectangle formed by the four edges and a rectangle to be restored, and the homography matrix may be applied to all pixels of the image to restore the distorted rectangle.

According to another aspect of one or more embodiments, there is provided at least one non-transitory computer readable medium including computer readable instructions that control at least one processor to implement methods of one or more embodiments.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings.

Figure 1:
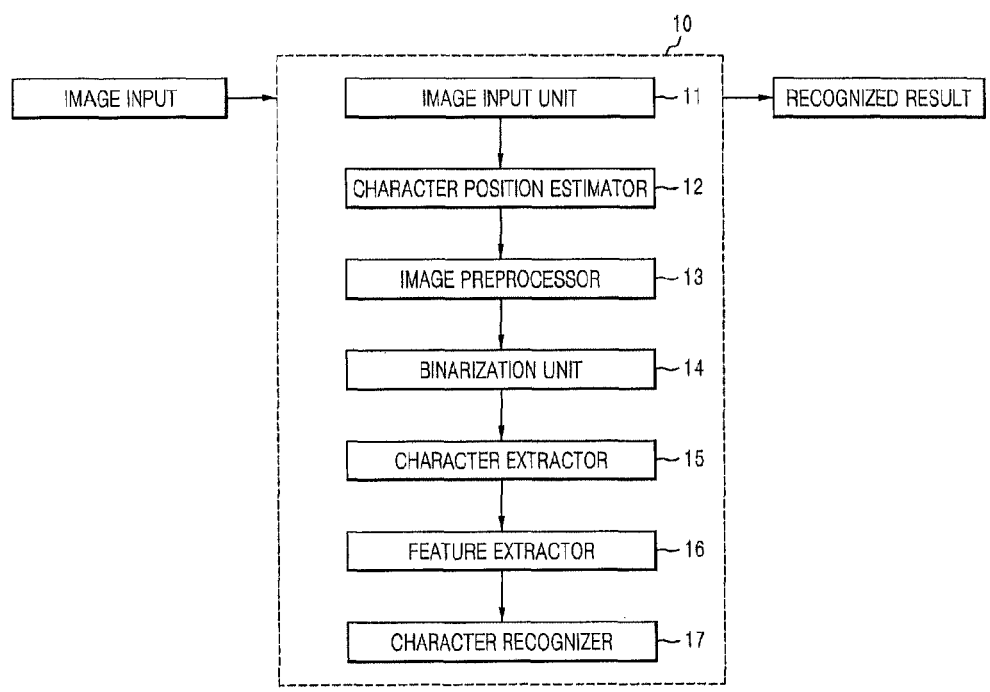
FIG. 1 is a control block diagram of a character recognition device according to example embodiments.

FIG. 1 is a control block diagram of a character recognition device 10 according to example embodiments.

As shown in FIG. 1, the character recognition device 10 may include an image input unit 11 to receive an image acquired by a camera, a character position estimator 12 to estimate a character region within the received image, an image preprocessor 13 to correct distortion of edges of a figure surrounding the character region, a binarization unit 14 to perform binarization with respect to the character region, a character extractor 15 to extract words and individual characters using a combination and separation algorithm in the binarized character region, a feature extractor 16 to extract the features of the extracted individual characters, and a character recognizer 17 to recognize the extracted individual characters.

The character position estimator 12 may perform wavelet transform, grade the wavelet transformed image, and apply a probability value, in which a character is positioned, to the graded image, in order to extract the character region from the received image.

The image preprocessor 13 may extract edges longer than a predetermined criterion from the image, detect edges surrounding characters in the extracted edges using a Random Sample Consensus (RANSAC) scheme, obtain a homography matrix, and correct the distortion of the edges surrounding the characters.

The binarization unit 14 may perform binarization within the character region corrected by the image preprocessor 13. The binarization unit 14 may calculate a threshold for binarization and perform local adaptive binarization to extract the characters while minimizing loss of strokes. The binarization unit 14 may perform binarization using a local adaptive binarization method of dividing the character region into sub-regions, examining brightness distributions of pixels of the sub-regions and performing binarization. In the local adaptive binarization method, the size of a sub-window, to which information about peripheral pixels is applied, may be intimately associated with the sizes of the characters.

The character extractor 15 may extract the words and the individual characters from the binarized character region using the combination and separation algorithm. The character extractor 15 may extract the words using vertical projection and blank information for character separation and then extract the individual characters using the combination and separation algorithm. In general, in Hangeul, because a character is composed of a combination of a vowel and a consonant unlike the other characters, the individual characters may be extracted by applying the combination and separation algorithm to connected pixels. At this time, the connected pixels other than the character, that is, the connected pixels other than a table, a figure, and a character appearing as the local binarization result, may be considered as noise and are eliminated. In particular, when a character image has both Korean and English characters, the individual characters may be extracted using the structural feature information of Korean and English. However, it is not limited thereto. For example, the characters may be Chinese and Japanese.

The feature extractor 16 may extract the features of the extracted individual characters. The feature extractor 16 may extract the features of the individual characters using a mesh feature, a distance information feature, and contour information in order to recognize the individual characters.

The character recognizer 17 may recognize the extracted individual characters. The character recognizer 17 may recognize the characters after classifying the types of the extracted individual characters. In order to recognize the characters when Korean, English, symbols and numerals are mixed, Korean is classified into six character types and English, symbols and numerals may be classified into a non-Korean type such that the characters are recognized according to the character types.

Figure 2:
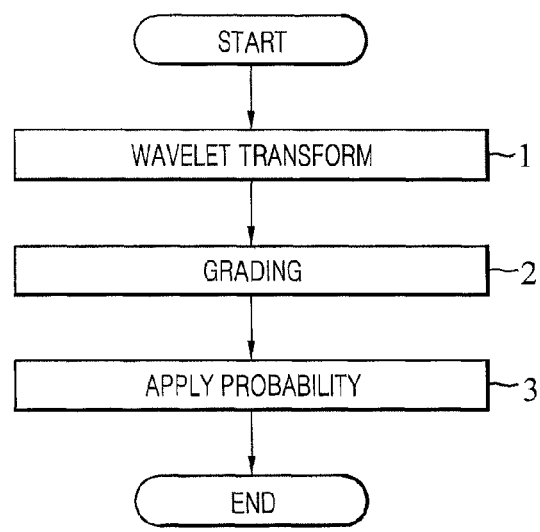
FIG. 2 is a flowchart illustrating an operation of a character position estimator according to example embodiments.
Figure 3A:
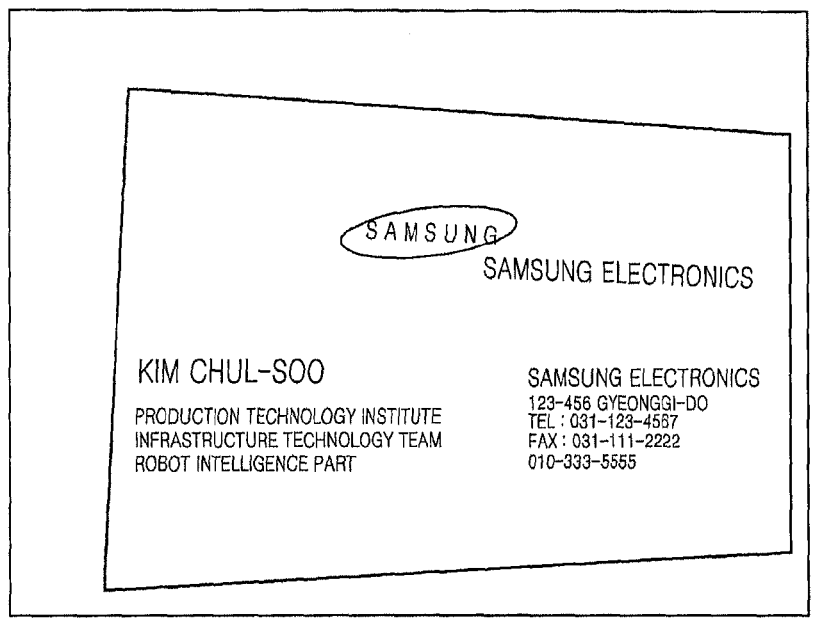
FIG. 3A is a diagram showing an image input to the character recognition device.
Figure 3B:
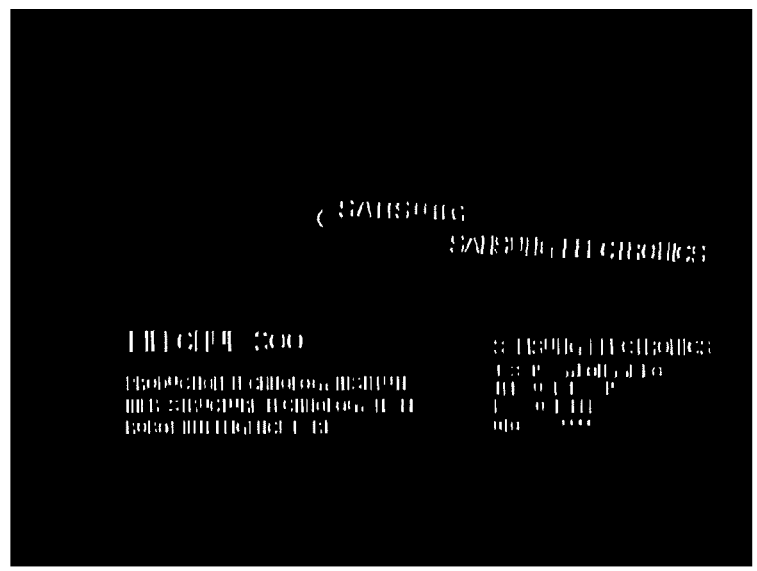
FIGS. 3B to 3D are views showing images transformed by performing wavelet transform with respect to an input image.
Figure 3C:
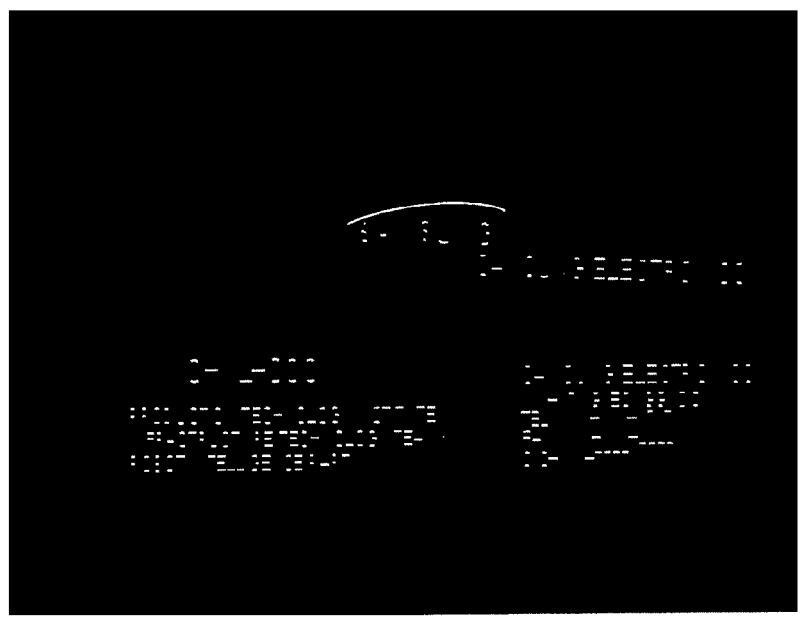
Figure 3D:
Figure 4:
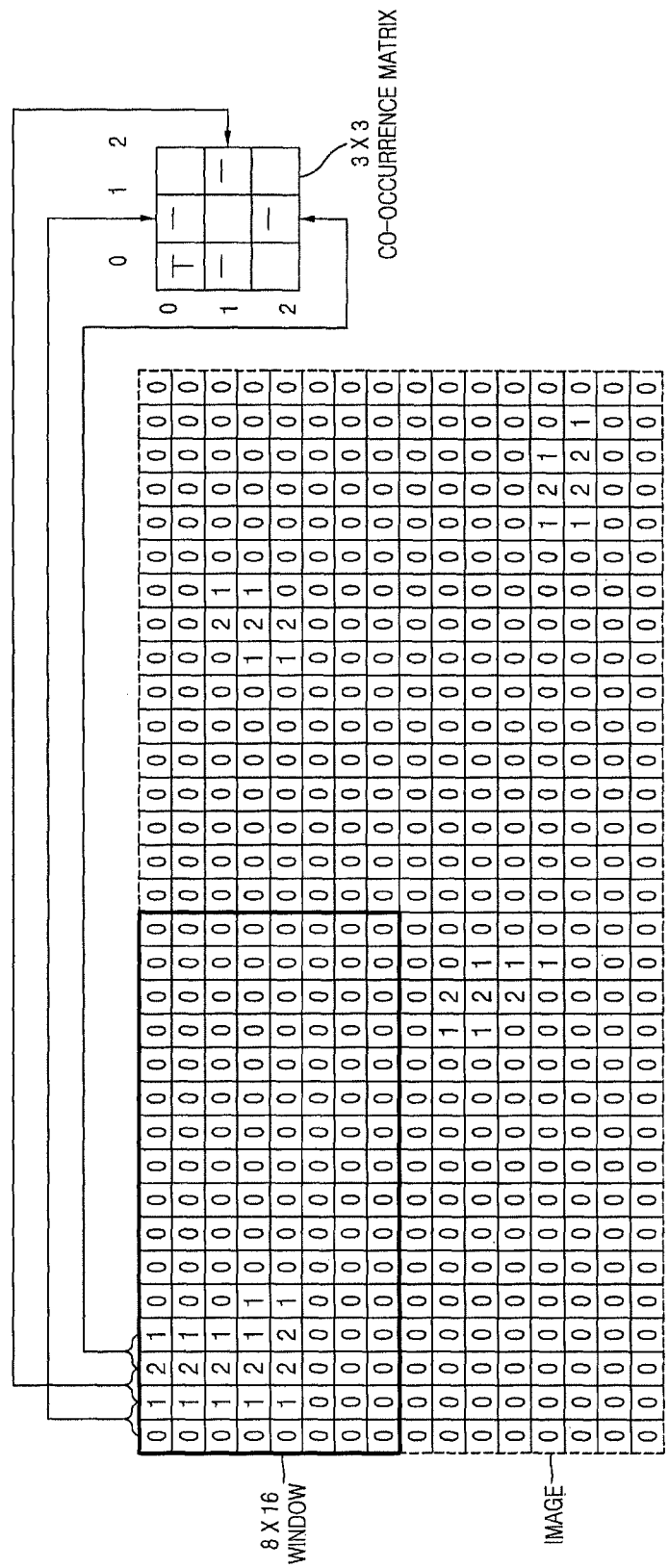
FIG. 4 is a diagram illustrating a method of obtaining a co-occurrence matrix from a wavelet-transformed image according to example embodiments.

FIG. 2 is a flowchart illustrating an operation of the character position estimator according to example embodiments, FIG. 3A is a diagram showing an image input to the character recognition device, and FIGS. 3B to 3D are views showing images transformed by performing wavelet transform with respect to an input image, and FIG. 4 is a diagram illustrating a method of obtaining a co-occurrence matrix from a wavelet-transformed image according to example embodiments.

As shown in FIG. 2, the character position estimator 12 may perform wavelet transform in order to extract the character region from the input image, grade the transformed image, and apply the probability value to the graded image. Hereinafter, this process will be described in detail (1 to 3).

The character position estimator 12 may perform wavelet transform in order to extract the character region from the image. Since the characters contained in the image are considerably different from a background in terms of brightness, a pixel in which a variation in brightness is large may be detected by comparison with a neighbor pixel through the wavelet transform (high-frequency components of the image in horizontal and vertical directions are detected). Wavelet transform may be obtained by Equation 1:

$$\begin{bmatrix} S_{LL}(x,y) & S_{LH}(x,y) \\ S_{HL}(x,y) & S_{HH}(x,y) \end{bmatrix} = \qquad \text{Equation 1}$$

$$HFH = H \begin{bmatrix} F(2x, 2y) & F(2x, 2y+1) \\ F(2x+1, 2y) & F(2x+1, 2y+1) \end{bmatrix} H$$

where, H denotes wavelet kernel and may be expressed by the following equation using Harr Transformation:

$$H = \frac{1}{\sqrt{2}} \begin{bmatrix} 1 & 1 \\ 1 & -1 \end{bmatrix} \qquad \text{Equation 2}$$

When Equation 2 is substituted into Equation 1, the following equation is obtained:

$$S_{LL}(x,y) = \frac{1}{2}[F(2x, 2y) + F(2x, 2y+1) + \qquad \text{Equation 3}$$
$$F(2x+1, 2y) + F(2x+1, 2y+1)]$$

$$S_{LH}(x,y) = \frac{1}{2}[F(2x, 2y) - F(2x, 2y+1) +$$
$$F(2x+1, 2y) - F(2x+1, 2y+1)]$$

$$S_{HL}(x,y) = \frac{1}{2}[F(2x, 2y) + F(2x, 2y+1) -$$
$$F(2x+1, 2y) - F(2x+1, 2y+1)]$$

$$S_{LL}(x,y) = \frac{1}{2}[F(2x, 2y) - F(2x, 2y+1) -$$
$$F(2x+1, 2y) + F(2x+1, 2y+1)]$$

At this time, S denotes four wavelet-transformed sub-bands, a subscript LL denotes a sub-band in which a variation in brightness value between pixels is small in a Y-axis direction (or a vertical direction) and an X-axis direction (or a horizontal axis) in the image, a subscript LH denotes a sub-band in which a variation in brightness value between pixels is small in the Y-axis direction and a variation in brightness value between pixels is large in the X-axis direction, a subscript HL denotes a sub-band in which a variation in brightness value between pixels is large in the Y-axis direction and a variation in brightness value between pixels is small in the X-axis direction, and a subscript HH denotes a sub-band in which a variation in brightness value between pixels is large in the Y-axis direction and the X-axis direction.

FIG. 3A shows an image of a business card that may be input into the character recognition device.

Meanwhile, when wavelet transform is performed by the above equations, as shown in FIGS. 3B to 3D, the input image may be transformed into an image according to brightness.

FIG. 3B shows an image transformed by SLH(x,y), i.e., the image of a sub-band in which a variation in brightness value between pixels may be small in the Y-axis direction and a variation in brightness value between pixels may be large in the X-axis direction. The edges of the Y-axis direction may be detected. That is, when the pixels having a large variation in brightness between pixels in the X-axis direction (horizontal direction) are displayed, vertical edges are displayed.

FIG. 3C shows an image transformed by SHL(x,y), i.e., the image of a sub-band in which a variation in brightness value between pixels may be large in the Y-axis direction and a variation in brightness value between pixels may be small in the X-axis direction. Edges of the X-axis direction may be detected.

FIG. 3D shows an image transformed by SHH(x,y), i.e., the image of a sub-band in which a variation in brightness value between pixels may be large in the Y-axis direction and the X-axis direction. Vertices may be detected.

Meanwhile, since SLH(x,y) denotes the sub-band in which a variation in brightness value between pixels may be small in the Y-axis direction and the X-axis direction and are not necessary for extracting the character region, SLH(x,y) is not used.

The character position estimator 12 grades the transformed image when the input image is transformed into the image according to the brightness by the wavelet transform. The character position estimator 12 may grade a background region of the transformed image to "0", grade a character boundary region to "1", and grade the character region to "2".

The character position estimator 12 may grade the transformed image and then obtain a co-occurrence matrix by an 8×16 sliding window. The co-occurrence matrix may be a 3×3 matrix, in which the values of rows and columns are as follows with respect to the sub-bands:

$C_{HL}$ (row: current pixel grade value/column: right lower pixel grade value)

$C_{LH}$ (row: current pixel grade value/column: lower pixel grade value)

$C_{HH1}$ (row: current pixel grade value/column: right lower pixel grade value)

$C_{HH2}$ (row: current pixel grade value/column: left lower pixel grade value)

As shown in FIG. 4, the co-occurrence matrix may be obtained according to the grade of the image checked in the 8×16 window after fitting the 8×16 window to the wavelet-transformed image. In CHL which is the co-occurrence matrix of FIG. 4, the number may be accumulated in a "row" corresponding to the grade value of the current pixel and a "column" corresponding to the grade value of the right pixel thereof while circulating the pixels of the 8×16 window. For example, because the grade value of the pixel of a first row and a first column of the 8×16 window may be "0" and the grade value of the right pixel thereof may be "1", 1 is accumulated in a 0th row and a first column of the co-occurrence matrix. If the pixel is moved to a next pixel in the 8×16 window, because the grade value of the pixel of a first row and a second column of the 8×16 window is "1" and the grade value of the right pixel thereof is "2", 1 may be accumulated in a first row and a second column of the co-occurrence matrix (The number is increased in the same row and the same column according to the number of times of accumulation). The first row and the first column of the co-occurrence matrix may be defined as a "0th" row and a "0th" column. It can be seen that a region having a large number of times of accumulation in the second row and the second column of the co-occurrence matrix may be a region where there is a high probability that the character is present.

The character position estimator 12 may obtain CHL, CLH, CHH1 and CHH2 which are the co-occurrence matrixes by the above-described method and obtain a probability value P(i,j) in which the character is present in an 8×16 region having a position (i,j) as a starting point by Equation 4:

$$P(i,j) = \alpha C_{LH}(i,j)[2][2] + \beta C_{HL}(i,j)[2][2] + \gamma C_{HH1}(i,j)[2][2] + \delta C_{HH2}(i,j)[2][2] \qquad \text{Equation 4}$$

where, α, β, γ and δ denote weights, CLH(i,j)[2][2] denotes the number of "1" accumulated in the second row and the second column of CLH, CHL(i,j)[2][2] denotes the number of "1" accumulated in the second row and the second column of CHH1, CHL(i,j)[2][2] denotes the number of "1" accumulated in the second row and the second column of CHH1, and CHH2(i,j)[2][2] denotes the number of "1" accumulated in the second row and the second column of CHH2.

As the number accumulated in the second row and the second column of the co-occurrence matrix is increased, a probability of the character being present may increase. Meanwhile, P(i,j) is a probability value of the character being present with respect to eight rows and 16 columns after fitting the first row and the first column of the 8×16 window to a position (i, j) of the image.

Figure 5:
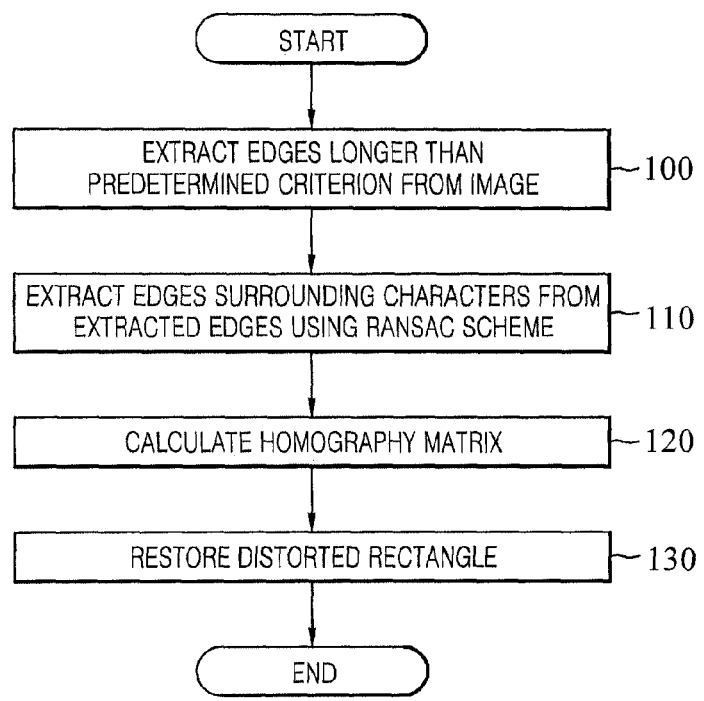
FIG. 5 is a flowchart illustrating an operation of an image preprocessor according to example embodiments.
Figure 6:
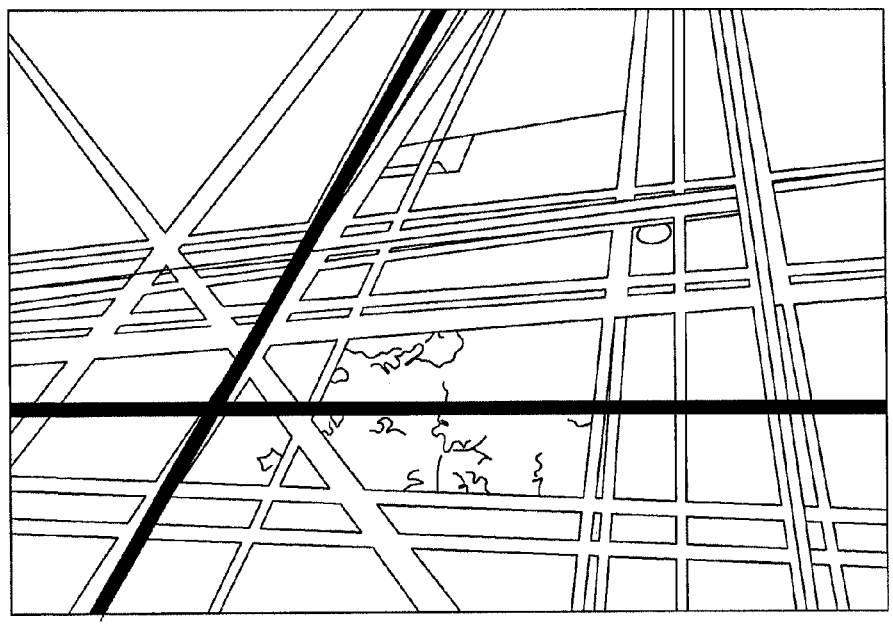
FIG. 6 is a diagram showing an image, from which straight lines are detected, according to example embodiments.
Figure 7:
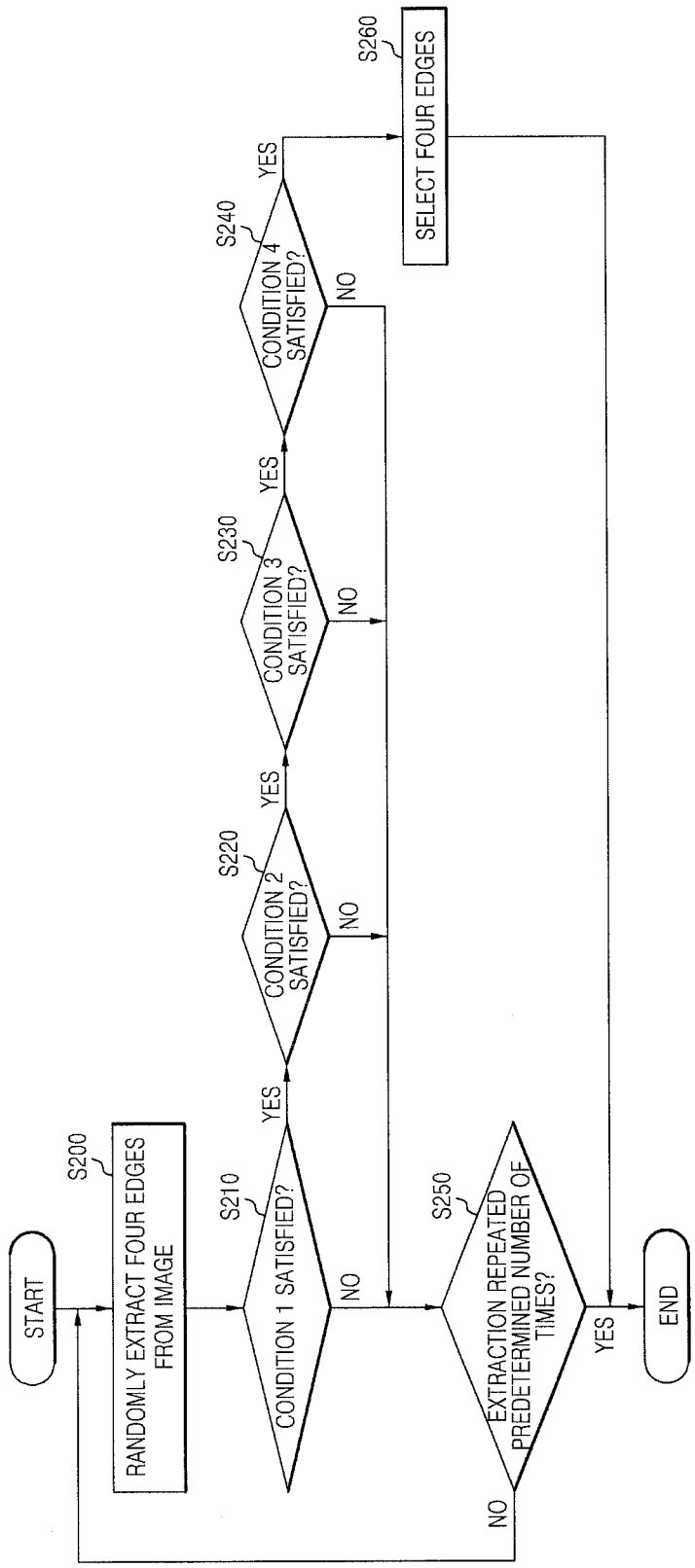
FIG. 7 is a flowchart illustrating a method of detecting edges using a Random Sample Consensus (RANSAC) scheme according to example embodiments.
Figure 8A:
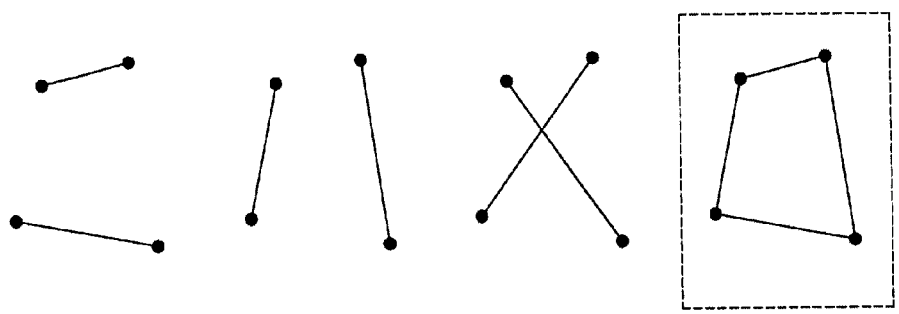
FIGS. 8A and 8B are diagrams showing two straight lines and a figure which may be formed by four vertices of edges extracted by example embodiments.
Figure 8B:
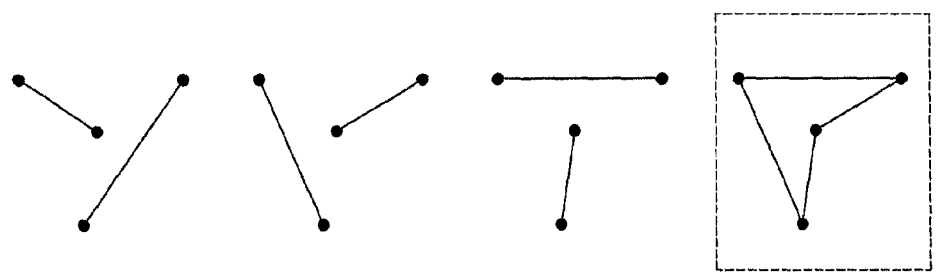
Figure 9A:
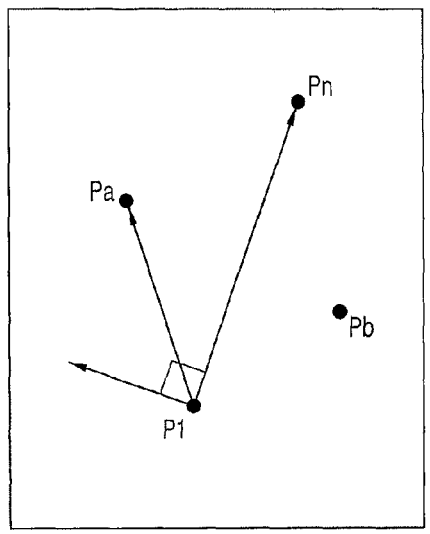
FIGS. 9A and 9B are diagrams of comparison of outer product vectors in order to determine whether two straight lines which may be formed by four vertices of the edges extracted by example embodiments cross each other.
Figure 9B:
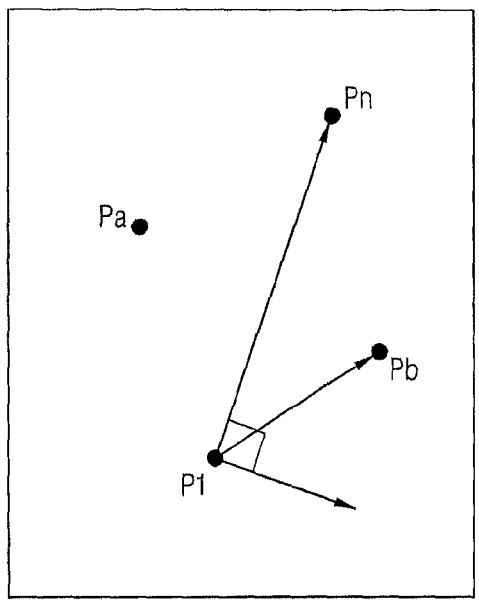
Figure 10A:
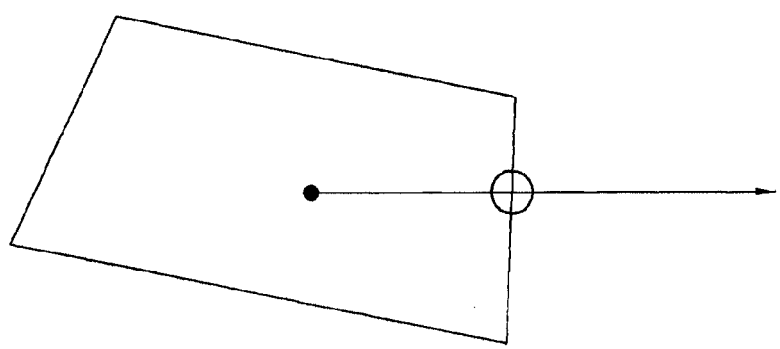
FIGS. 10A and 10B are diagrams illustrating a method of determining whether a center of gravity of a probability value of a character region in a figure formed by four edges extracted by example embodiments is present.
Figure 10B:
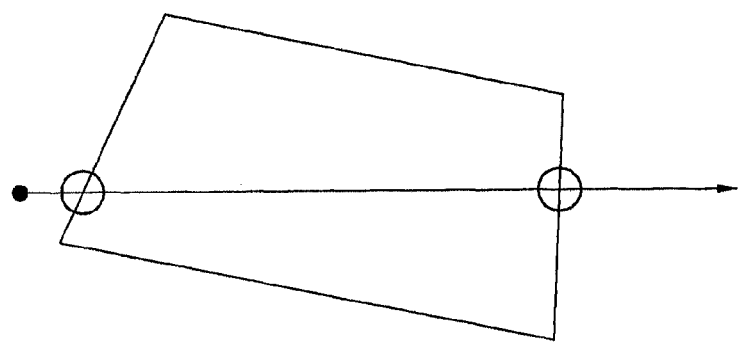
Figure 11:
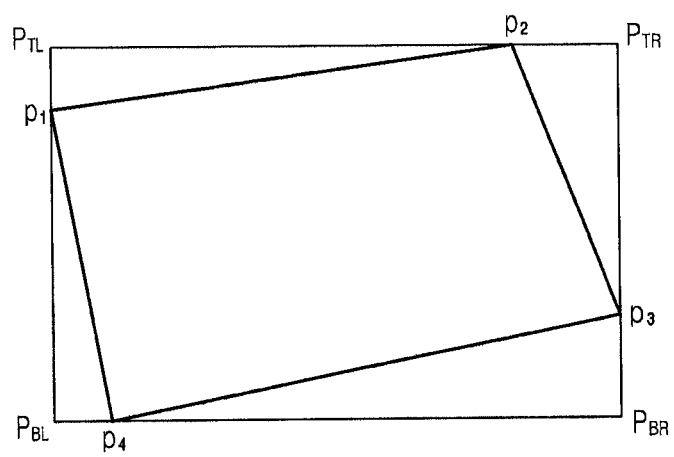
FIG. 11 is a diagram illustrating a process of transforming a distorted figure formed by four edges extracted by example embodiments into a rectangle.
Figure 12:
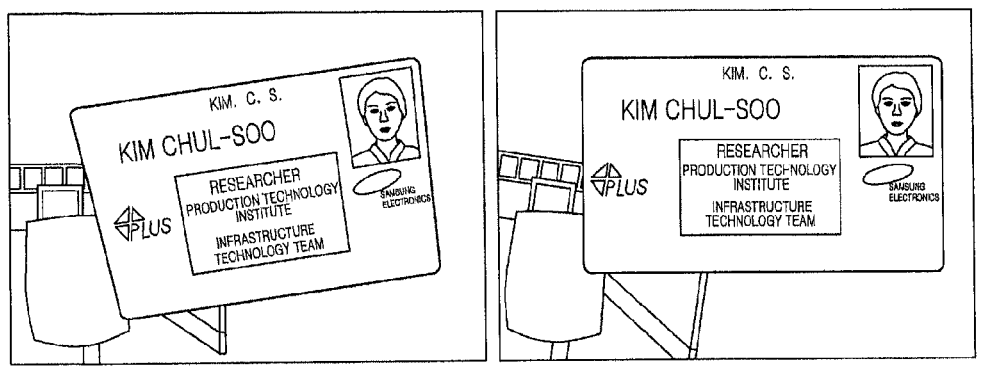
FIG. 12 is a diagram of comparison between states before and after a rectangle formed by four edges extracted by example embodiments.

FIG. 5 is a flowchart illustrating an operation of an image preprocessor according to example embodiments, FIG. 6 is a diagram showing an image, from which edges are detected, according to example embodiments, FIG. 7 is a flowchart illustrating a method of detecting edges using a RANSAC scheme according to example embodiments, FIGS. 8A and 8B are diagrams showing two straight lines and a figure which may be formed by four vertices of edges extracted by example embodiments, FIGS. 9A and 9B are diagrams of comparison of outer vectors in order to determine whether two straight lines which may be formed by four vertices of the edges extracted by example embodiments cross each other, FIGS. 10A and 10B are diagrams illustrating a method of determining whether a center of gravity of a probability value of a character region in a figure formed by four edges extracted by example embodiments is present, FIG. 11 is a diagram illustrating a process of restoring a distorted figure formed by four edges extracted by example embodiments into a rectangle, and FIG. 12 is a diagram of comparison states between before and after a rectangle formed by four edges extracted by example embodiments.

As shown in FIG. 5, the image preprocessor 13 extracts the edges longer than the predetermined criterion from the image, detects edges surrounding the characters from the extracted edges using the RANSAC scheme, obtains the homography matrix, and corrects the distortion of the edges surrounding the characters, thereby restoring a rectangle (100 to 130).

The image preprocessor 13 extracts the edges longer than the predetermined criterion from the image through Hough Transform. The Hough Transform may refer to a method of detecting a straight line from an image, i.e., a method of deriving a straight line by transforming a linear equation into a parameter space. The Hough Transform is an algorithm detecting a straight line by transforming a linear equation of a two-dimensional image coordinate into a parameter space. For example, in a two-dimensional space, a linear equation is y=ax+b, where a denotes slope and b denotes y-intercept. The linear equation is defined in a two-dimensional coordinate space in which a horizontal axis is x and a vertical axis is y. At this time, a and b are parameters for determining the linear shape. If rearrangement and modification are performed with respect to b in order to represent the linear equation in a space in which a horizontal axis is a and a vertical axis is b, b=−xa+y may be obtained. If the linear equation in a two-dimensional xy space is modified to an ab space, the straight line of the two-dimensional xy space may be expressed by one point in the ab space and one point of the xy space may be expressed by a straight line in the ab space. The Hough Transform may detect the straight line in the xy space using such a phenomenon. Referring to FIG. 6, it can be seen that the edges longer than the predetermined criterion may be detected by applying the Hough Transform to the wavelet-transformed image.

The image preprocessor 13 may use the RANSAC scheme in order to detect four edges surrounding the character, when the edges are detected from the input image by Hough Transform. The image preprocessor 13 may randomly detect four edges and determine whether the below-condition is satisfied.

Referring to FIG. 7, the image preprocessor 13 may recognize an i-th edge as e(i) when the number of edges contained in the image is N, and select a plurality of edges satisfying four conditions as edges, distortion of which will be corrected if randomly extracted four edges e(1), e(2), e(3) and e(4) satisfy the below-described conditions.

Condition 1 may indicate that all intersection points between the extracted four edges are present in the image. When the intersection points between the randomly extracted four edges e(1), e(2), e(3) and e(4) are P(m,n), {m,n=1, 2, 3, 4}, P(m,n) is present in the image. Condition 1 is necessary for eliminating an erroneous combination between the four edges within the image.

Condition 2 may indicate that the four edges form a convex rectangle. When a rectangle surrounding the characters is geometrically modified according to the direction of the camera, perspective transform may occur and a convex closed curve may be maintained. Determination as to whether or not Condition 2 may be satisfied may be performed depending on whether or not straight lines formed through the intersection points between the randomly extracted edges cross each other. Referring to FIG. 8A, it may be seen that, when the number of times of crossing of two straight lines connected between the intersection points between randomly extracted four edges is 1, a rectangle formed by the four edges may be a convex rectangle. Referring to FIG. 8B, it may be seen that, when the number of times of crossing of two straight lines connected between the intersection points between randomly extracted four edges is 0, a rectangle formed by the four edges is a concave rectangle. Therefore, Condition 2 may be satisfied when the number of times of crossing of the straight lines connected between the intersection points between the randomly extracted four edges is 1. Meanwhile, determination as to whether the number of times of crossing of the straight lines connected between the intersection points between the four edges is 1 may be performed by the following method. Referring to FIGS. 9A and 9B, when the four intersection points between the randomly extracted edges are P1, Pa, Pb and Pn and a segment <PaPb> crosses a straight line <P1Pn>, an outer product vector L1 of the vector <P1Pn> and the vector <P1Pa> and an outer product vector L2 of the vector <P1Pn> and the vector <P1Pb> have opposite directions (difference of 180 degrees). Meanwhile, the outer product vector may be obtained by Equation 5:

$$L_1 = \hat{n} |\overline{P_1 P_n}| |\overline{P_1 P_a}| \sin \theta$$

$$L_2 = \hat{n} |\overline{P_1 P_n}| |\overline{P_1 P_b}| \sin \theta \quad \text{Equation 5}$$

The image preprocessor 13 may set one of the four intersection points of the randomly extracted edges as a reference point P1, form a vector using P1 and one point Pn of the remaining intersection points (Pn, Pn=2, 3, 4), and set the remaining two points as Pa and Pb. The image preprocessor 13 may obtain the outer product vector L1 with the vector P1Pa based on the vector P1Pn, and obtain the outer product vector L2 with the vector P1Pb based on the vector P1Pn. The image preprocessor 13 may use Equation 6 in order to determine whether the directions of the outer product vectors L1 and L2 are opposite to each other, i.e., the difference therebetween is 180 degrees:

$$\alpha = \cos^{-1}\{L1 \cdot L2/|L1| \cdot |L2|\} \quad \text{Equation 6}$$

If α calculated by Equation 6 is 180 degrees, the directions of the outer product vectors L1 and L2 may be opposite to each other.

The image preprocessor 13 may cyclically set each of the intersection points of the randomly extracted four edges as the reference point P1 by the above-described method, and compare the directions of the outer product vectors by the above-described method. If the number of cases where the directions of the outer product vectors L1 and L2 are opposite to each other is one with respect to each of the intersection points, a figure formed by the randomly extracted four edges becomes a convex rectangle (210).

Condition 3 may indicate that one of the randomly extracted four edges is close to perpendicular to two edges and is close to parallel to another edge. The image preprocessor 13 may measure an angle between an x-axis and each of the randomly extracted four edges and an angle between a y-axis and each of the randomly extracted four edges, and calculate angles between the edges using the measured angles.

The image preprocessor 13 may determine that the edges are close to perpendicular to each other if the angle θ between the edges is 70°<θ<110° (first angle range), determine that the edges are close to parallel to each other if the angle θ between the edges is θ<20° or θ>160° (second angle range), and determine that the edges are not close to perpendicular or parallel to each other if the angle between the edges is outside the first angle range or the second angle range (230).

Condition 4 may indicate that the center of gravity of the probability value of the character region is present in the rectangle. The image preprocessor 13 may obtain the center of gravity of the probability value of the character region obtained by the character position estimator 12. The image preprocessor 13 may apply "1" to each pixel if the probability value of the character region is greater than a threshold and applies "0" to each pixel if the probability value of the character region is less than the threshold. The image preprocessor 13 may obtain an x-coordinate average value and a y-axis average value of the coordinates, to which "1" is applied, of the image and determines the center of gravity of the probability value of the character region. The image preprocessor 13 may determine whether the center of gravity of the probability value of the character region is present in the rectangle formed by the randomly extracted four edges. Referring to FIGS. 10A and 10B, if the center of gravity of the probability value of the character region is present in the rectangle formed by the randomly extracted edges, an odd number of intersection points may be obtained when a segment extends from the center of gravity in the x-axis direction and, if the center of gravity of the probability value of the character region is outside the rectangle formed by the randomly extracted edges, an even number of intersection points may be obtained when a segment extends from the center of gravity in the x-axis direction (240).

The image preprocessor 13 may extract four vertices satisfying conditions 1 to 4, and determine that a figure formed by these vertices is a character region of the image. If four vertices are extracted a predetermined number of times (e.g., 1000 times) but the vertices satisfying conditions 1 to 4 are not extracted, it may be determined that a character region is not present (250 and 260).

The image preprocessor 13 may correct the distortion of the rectangle using a homography matrix when the four vertices used as the basis of the character region are detected by the above-described method. The image preprocessor 13 may obtain the homography matrix having a relationship between the rectangle extracted from the image and a rectangle to be restored. Referring to FIG. 11, when vertices of the rectangle to be restored are PTL, PTR, PBL and PBR and the intersection points of the edges extracted from the image are P1, P2, P3 and P4, the x and y coordinate values of PTL, PTR, PBL and PBR may be obtained by Equation 7:

$$P_{TL}(x) = \min(P_1(x), P_2(x), P_3(x), P_4(x))$$

$$P_{TL}(y) = \min(P_1(y), P_2(y), P_3(y), P_4(y))$$

$$P_{TR}(x) = \max(P_1(x), P_2(x), P_3(x), P_4(x))$$

$$P_{TR}(y) = \min(P_1(y), P_2(y), P_3(y), P_4(y))$$

$$P_{BL}(x) = \min(P_1(x), P_2(x), P_3(x), P_4(x))$$

$$P_{BL}(y) = \min(P_1(y), P_2(y), P_3(y), P_4(y))$$

$$P_{BR}(x) = \min(P_1(x), P_2(x), P_3(x), P_4(x))$$

$$P_{BR}(y) = \min(P_1(y), P_2(y), P_3(y), P_4(y)) \quad \text{Equation 7}$$

When the x and y coordinate values of PTL, PTR, PBL and PBR are obtained by the above equation, pairs of P1, P2, P3 and P4 and PTL, PTR, PBL and PBR may be obtained by Equation 8:

$$\text{Pair}(P_n, P_m) = \arg\min \sqrt{(P_n \cdot x - P_m \cdot x)^2 + (P_n \cdot y - P_m \cdot y)^2} \quad \text{Equation 8}$$

n=1, 2, 3, 4
m=TR,TL,BR,BL

That is, the distances between P1, P2, P3 and P4 and PTL, PTR, PBL and PBR to be restored may be obtained and the pairs of vertices and intersection points that are closest may be obtained and matched.

The image preprocessor 13 may obtain the homography matrix when the pairs of the intersection points P1, P2, P3 and P4 of the edges extracted from the image and the vertices PTL, PTR, PBL and PBR of the rectangle to be restored are determined. When the coordinate of the transformed rectangle is P(x, y) and the coordinate of the rectangle before transform is p(x, y), the relationship may be expressed by Equation 9:

$$P = Hp \quad \text{Equation 9}$$

In addition, when Equation 9 is expressed by a homogeneous matrix, Equation 10 may be obtained:

$$\begin{bmatrix} x' \\ y' \\ z' \end{bmatrix} = \begin{bmatrix} h_1 & h_2 & h_3 \\ h_4 & h_5 & h_6 \\ h_7 & h_8 & h_9 \end{bmatrix} \begin{bmatrix} x \\ y \\ 1 \end{bmatrix} \quad \text{Equation 10}$$

When Equation 10 is calculated to obtain an x coordinate P(x) and a y coordinate P(y) of P(x, y), Equation 11 may be obtained:

$$P(x) = \frac{x'}{z'} = \frac{h_1 x + h_2 y + h_3}{h_7 x + h_8 y + h_9} \quad \text{Equation 11}$$

$$P(y) = \frac{y'}{z'} = \frac{h_4 x + h_5 y + h_6}{h_7 x + h_8 y + h_9}$$

When the four vertices before restoration are p1(x1, y1), p2(x2, y2), p3(x3, y3) and p4(x4, y4) and the vertices of the rectangle to be stored are p1(x1', y1'), p2(x2', y2'), p3(x3', y3') and p4(x4', y4'), Equation 11 may be expressed by a matrix of Equation 12.

$$\begin{bmatrix} x_1 & y_1 & 1 & 0 & 0 & 0 & x_1 x_1' & y_1 x_1' & x_1' \\ 0 & 0 & 0 & x_1 & y_1 & 1 & x_1 y_1' & y_1 y_1' & y_1' \\ x_2 & y_2 & 1 & 0 & 0 & 0 & x_2 x_2' & y_2 x_2' & x_2' \\ 0 & 0 & 0 & x_2 & y_2 & 1 & x_2 y_2' & y_2 y_2' & y_2' \\ x_3 & y_3 & 1 & 0 & 0 & 0 & x_3 x_3' & y_3 x_3' & x_3' \\ 0 & 0 & 0 & x_3 & y_3 & 1 & x_3 y_3' & y_3 y_3' & y_3' \\ x_4 & y_4 & 1 & 0 & 0 & 0 & x_4 x_4' & y_4 x_4' & x_4' \\ 0 & 0 & 0 & x_4 & y_4 & 1 & x_4 y_4' & y_4 y_4' & y_4' \end{bmatrix} \begin{bmatrix} h_1 \\ h_2 \\ h_3 \\ h_4 \\ h_5 \\ h_6 \\ h_7 \\ h_8 \\ h_9 \end{bmatrix} = 0 \quad \text{Equation 12}$$

The image preprocessor 13 may perform Singular Value Decomposition (SVD) with respect to the matrix of Equation 11 to obtain the homography matrix. When the homography matrix is obtained by the above-described method, the image preprocessor 13 may apply the homography matrix to all the pixels of the image to display the image in which the character region is restored to the rectangle. Referring to FIG. 12, it may be seen that, if the homography matrix is applied to all the pixels of the image, the rectangle including the distorted character region may be restored.

Figure 13:
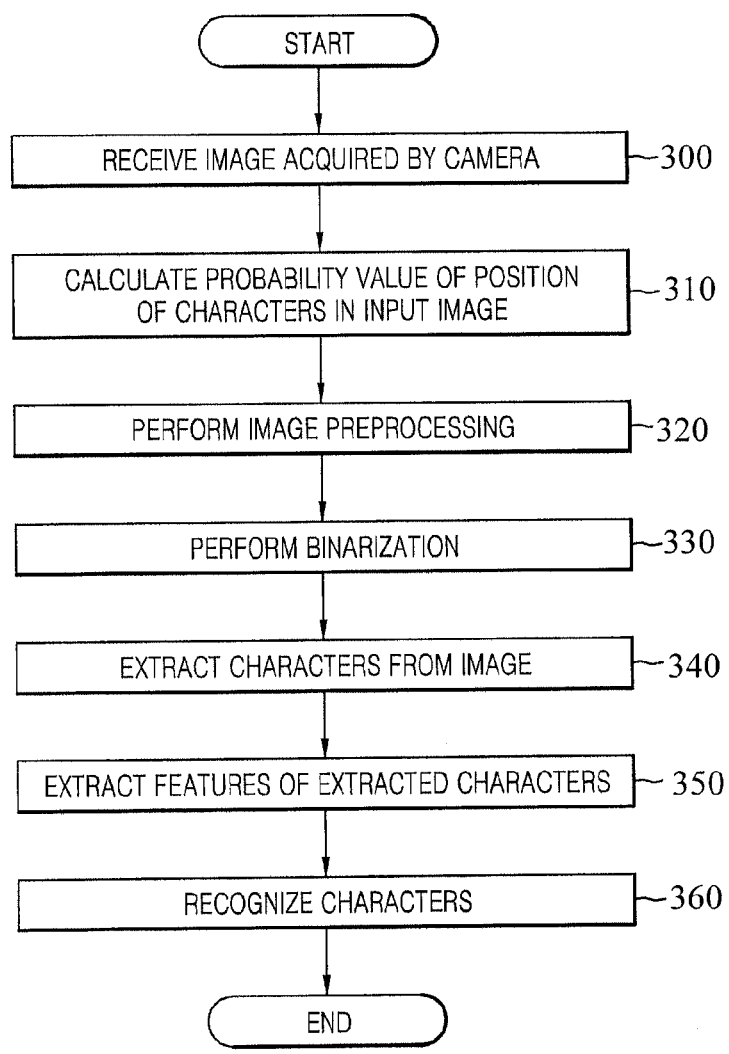
FIG. 13 is a flowchart of a method of controlling a character recognition device according to example embodiments.

FIG. 13 is a flowchart of a method of controlling a character recognition device according to example embodiments.

As shown in FIG. 13, the character recognition device 10 may receive the image acquired by the camera through the image input unit 11 (300).

Next, the character position estimator 12 may obtain the probability value of the position of the characters in the input image. In other words, the character position estimator 12 may perform wavelet transform, grade the wavelet-transformed image, and obtain the probability value of the position of the character with respect to the graded image, in order to extract the character region from the input image (310).

Next, the image preprocessor 13 may perform image preprocessing upon the input image. The image preprocessor 13 may extract the edges longer than the predetermined criterion from the image, detect the edges surrounding the characters from the extracted edges using the RANSAC scheme, obtain the homography matrix in order to correct the distortion of the edges surrounding the characters, and apply the homography matrix to the pixels of the image to correct the distortion of the edges surrounding the characters (320).

Next, the binarization unit 14 may perform binarization with respect to the image, the distortion of which is corrected. The binarization unit 14 may divide the character region into sub-regions, examine the brightness distribution of the pixels of the sub-regions, and apply the local adaptive binarization method to perform binarization (330).

Next, the character extractor 15 may extract the words and the individual characters using the combination and separation algorithm from the binarized image. The character extractor 15 may extract the words using vertical projection and blank information for character separation and extract the individual characters using the combination and separation algorithm (340).

Next, the feature extractor 16 may extract the features of the extracted individual characters. The feature extractor 16 may extract the features of the individual characters using the mesh feature, the distance information feature, and the contour information in order to recognize the individual characters (350).

Next, the character recognizer 17 may recognize the extracted individual characters. The character recognizer 17 may recognize the characters after classifying the types of the extracted individual characters (360).

The above-described embodiments may be recorded in computer-readable media including program instructions to implement various operations embodied by a computer. The media may also include, alone or in combination with the program instructions, data files, data structures, and the like. Examples of computer-readable media (computer-readable storage devices) include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although embodiments have been shown and described, it should be appreciated by those skilled in the art that changes may be made in these example embodiments without departing from the principles and spirit of the disclosure, the scope of which is defined in the claims and their equivalents.

What is claimed is:

1. A character recognition device, comprising:
    an image input unit to receive an image acquired by an image device;
    a character position estimator to calculate a probability value of a position of characters of the image to estimate the position of the characters;
    an image preprocessor to detect a plurality of edges including the characters from the image and to correct distortion of the edges; and
    a character recognizer to recognize the characters included in the plurality of edges.

2. The character recognition device according to claim 1, wherein the character position estimator performs wavelet transform to the input image and grades the wavelet-transformed image.

3. The character recognition device according to claim 2, wherein the grading of the wavelet-transformed image by the character position estimator is performed by dividing the wavelet-transformed image into predetermined regions and grading the regions.

4. The character recognition device according to claim 3, wherein the predetermined regions includes at least one of a character region, a character boundary region and a background region.

5. The character recognition device according to claim 2, wherein the character position estimator obtains a co-occurrence matrix from the graded image, substitutes the co-occurrence matrix into a following Equation, and calculates the probability of the position of the characters of the image:

$$P(i,j) = \alpha C_{LH}(i,j)[2][2] + \beta C_{HL}(i,j)[][2] + \gamma C_{HH1}(i,j)[2][2] + \delta C_{HH2}(i,j)[2][2] \quad \text{Equation}$$

(where, α, β, γ and δ denote weights, $C_{LH}(i,j)[2][2]$ denotes a number of "1" accumulated in a second row and a second column of $C_{LH}$, $C_{HL}(i,j)[2][2]$ denotes a number of "1" accumulated in a second row and a second column of $C_{HH1}$, $C_{HL}(i,j)[2][2]$ denotes a number of "1" accumulated in the second row and the second column of $C_{HH1}$, and $C_{HH2}(i,j)[2][2]$ denotes a number of "1" accumulated in a second row and a second column of $C_{HH2}$).

6. The character recognition device according to claim 1, wherein the image preprocessor extracts edges longer than a predetermined criterion from the input image and extracts the plurality of edges including the characters from the extracted edges.

7. The character recognition device according to claim 6, wherein the image preprocessor extracts the plurality of edges including the characters from the extracted edges using a Random Sample Consensus (RANSAC) scheme.

8. The character recognition device according to claim 7, wherein the image preprocessor randomly extracts four edges of the edges longer than the predetermined criterion using the RANSAC scheme, determines whether a rectangle formed by the four edges includes the characters, and extracts the four edges including the characters.

9. The character recognition device according to claim 8, wherein the determination by the image preprocessor of whether the rectangle formed by the four edges includes the characters is performed by determining whether all intersection points between the four edges are present in the image.

10. The character recognition device according to claim 8, wherein the determination by the image preprocessor of whether the rectangle formed by the four edges includes the characters is performed by determining whether the four edges form a convex rectangle.

11. The character recognition device according to claim 10, wherein the determination by the image preprocessor of whether the rectangle formed by the four edges includes the characters is performed by checking a number of times of crossing of straight lines formed by intersection points of the four edges to determine whether the four edges form the convex rectangle.

12. The character recognition device according to claim 8, wherein the determination by the image preprocessor of whether the rectangle formed by the four edges includes the characters is performed by determining whether an angle between one edge and each of another two edges of the four edges are in a first angle range.

13. The character recognition device according to claim 12, wherein:
the first angle range is 70°<θ<110°, and
if the angle between one edge and each of the another two edges of the four edges is in the first angle range, one edge of the four edges extends to be close to a direction perpendicular to the another two edges.

14. The character recognition device according to claim 8, wherein the determination by the image preprocessor of whether the rectangle formed by the four edges includes the characters is performed by determining whether an angle between one edge and another edge out of the four edges is in a second angle range.

15. The character recognition device according to claim 14, wherein:
the second angle range is θ<20° or θ>160°, and
if the angle between one edge and another edge out of the four edges is in the second angle range, one edge of the four edges extends to be close to a direction parallel to another edge.

16. The character recognition device according to claim 8, wherein the determination by the image preprocessor of whether the rectangle formed by the four edges includes the characters is performed by determining whether a center of gravity of the probability value of the position of the characters in the image is present in the rectangle formed by the four edges.

17. The character recognition device according to claim 16, wherein the image preprocessor compares the probability value of the position of the characters in each pixel of the image with a threshold, calculates an x-coordinate average value and a y-coordinate average value of coordinates having the probability value of the position of the characters greater than the threshold, and calculates the center of gravity of the probability value.

18. The character recognition device according to claim 8, wherein the image preprocessor calculates a homography matrix to correct distortion of the rectangle formed by the four edges, when the four edges including the characters are extracted.

19. The character recognition device according to claim 18, wherein the homography matrix includes a matrix having a relationship between the rectangle formed by the four edges and a rectangle to be restored, and the image preprocessor applies the homography matrix to all pixels of the image to restore the distorted rectangle.

20. The character recognition device according to claim 1, further comprising a binarization unit to perform binarization to the image, the distortion of the edges of which is corrected by the image preprocessor.

21. The character recognition device according to claim 20, further comprising a character extractor to extract words and individual characters from the binarized image.

22. The character recognition device according to claim 21, further comprising a feature extractor to extract features of the extracted words and individual characters.

23. A method of controlling a character recognition device, the method comprising:
calculating, by a computer, a probability value of a position of characters in an input image to estimate the position of the characters;
extracting, by the computer, a plurality of edges including the characters to correct distortion; and
recognizing, by the computer, the characters included in the plurality of edges.

24. The method according to claim 23, wherein the calculating of the probability value of the position of the characters in the input image includes performing wavelet transform to the input image, grading the wavelet-formed image, and obtaining a co-occurrence matrix of the graded image to calculate the probability value of the position of the characters.

25. The method according to claim 24, wherein the obtaining of the co-occurrence matrix to calculate the probability value of the position of the characters includes substituting the co-occurrence matrix into a following Equation to calculate the probability value of the position of the characters:

$$P(i,j) = \alpha C_{LH}(i,j)[2][2] + \beta C_{HL}(i,j)[][2] + \gamma C_{HH1}(i,j)[2][2] + \delta C_{HH2}(i,j)[2][2]$$  Equation (where, α, β, γ and δ denote weights, $C_{LH}(i,j)[2][2]$ denotes a number of "1" accumulated in a second row and a second column of $C_{LH}$, $C_{HL}(i,j)[2][2]$ denotes a number of "1" accumulated in a second row and a second column of $C_{HH1}$, $C_{HL}(i,j)[2][2]$ denotes the number of "1" accumulated in the second row and the second column of $C_{HH1}$, and $C_{HH2}(i,j)[2][2]$ denotes a number of "1" accumulated in a second row and a second column of $C_{HH2}$).

26. The method according to claim 23, wherein the extracting of the plurality of edges including the characters to correct the distortion includes extracting edges longer than a predetermined criterion from the input image and extracting the plurality of edges including the characters from the extracted edges to correct the distortion.

27. The method according to claim 26, wherein the extracting of the plurality of edges including the characters includes extracting four edges of the edges longer than the predetermined criterion using a Random Sample Consensus (RANSAC) scheme, determining whether a rectangle formed by the four edges includes the characters, and extracting the four edges including the characters.

28. The method according to claim 27, wherein the determining of whether the rectangle formed by the four edges includes the characters includes determining whether all intersection points between the four edges are present in the image.

29. The method according to claim 27, wherein the determining of whether the rectangle formed by the four edges includes the characters includes determining whether the four edges form a convex rectangle.

30. The method according to claim 29, wherein the determining of whether the rectangle formed by the four edges includes the characters includes checking the number of times of crossing of straight lines formed by intersection points of the four edges to determine whether the four edges form the convex rectangle.

31. The method according to claim 27, wherein the determining of whether the rectangle formed by the four edges includes the characters includes determining whether an angle between one edge and each of another two edges of the four edges are in a first angle range.

32. The method according to claim 31, wherein:
the first angle range is 70°<θ<110°, and
if the angle between one edge and each of the another two edges of the four edges is in the first angle range, one edge of the four edges extends to be close to a direction perpendicular to the another two edges.

33. The method according to claim 27, wherein the determining of whether the rectangle formed by the four edges includes the characters includes determining whether an angle between one edge and another edge of the four edges is in a second angle range.

34. The method according to claim 33, wherein:
the second angle range is θ<20° or θ>160°, and
if the angle between one edge and another edge of the four edges is in the second angle range, one edge of the four edges extends to be close to a direction parallel to another edge.

35. The method according to claim 27, wherein the determining of whether the rectangle formed by the four edges includes the characters includes determining whether a center of gravity of the probability value of the position of the characters in the image is present in the figure formed by the four edges.

36. The method according to claim 35, wherein the probability value of the position of the characters in each pixel of the image is compared with a threshold, an x-coordinate average value and a y-coordinate average value of coordinates having the probability value of the position of the characters greater than the threshold are calculated, and the center of gravity of the probability value is calculated.

37. The method according to claim 27, wherein, when the four edges including the characters are extracted, a homography matrix is calculated to correct the distortion of the rectangle formed by the four edges.

38. The method according to claim 37, wherein the homography matrix includes a matrix having a relationship between the rectangle formed by the four edges and a rectangle to be restored, and the homography matrix is applied to all pixels of the image to restore the distorted rectangle.

39. At least one non-transitory computer readable medium comprising computer readable instructions that control at least one processor to implement a method, comprising:
calculating a probability value of a position of characters in an input image to estimate the position of the characters;
extracting a plurality of edges including the characters to correct distortion; and
recognizing the characters included in the plurality of edges.

* * * * *

UNITED STATES PATENT AND TRADEMARK OFFICE
CERTIFICATE OF CORRECTION

PATENT NO. : 8,509,536 B2  
APPLICATION NO. : 12/945124  
DATED : August 13, 2013  
INVENTOR(S) : Hyo Seok Hwang et al.

It is certified that error appears in the above-identified patent and that said Letters Patent is hereby corrected as shown below:

In the Claims  
In Column 14, Line 66, In Claim 5, delete "[][2]" and insert -- [2][2] --, therefor.  
In Column 16, Line 60, In Claim 25, delete "[][2]" and insert -- [2][2] --, therefor.

Signed and Sealed this  
Eighteenth Day of February, 2014

Michelle K. Lee  
*Deputy Director of the United States Patent and Trademark Office*